United States Patent
Yang

(10) Patent No.: US 8,864,248 B2
(45) Date of Patent: Oct. 21, 2014

(54) COMPUTER CASE

(71) Applicant: Giga-Byte Technology Co., Ltd., New Taipei (TW)

(72) Inventor: Jia Lin Yang, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 0 days.

(21) Appl. No.: 13/762,390

(22) Filed: Feb. 8, 2013

(65) Prior Publication Data
US 2014/0225487 A1    Aug. 14, 2014

(51) Int. Cl.
*A47B 81/06* (2006.01)
*H05K 5/02* (2006.01)

(52) U.S. Cl.
CPC .................................. *H05K 5/0217* (2013.01)
USPC ...................... 312/223.2; 312/334.3; 312/205

(58) Field of Classification Search
USPC ............. 312/223.1–223.2, 334.2–334.3, 205;
361/679.01, 679.06; 403/80, 116;
220/4.03, 720, 6, 666, 8, 9.2–9.4;
108/145, 42, 143
See application file for complete search history.

(56) References Cited

U.S. PATENT DOCUMENTS

| | | | | |
|---|---|---|---|---|
| 460,748 A * | 10/1891 | Hartmann | ........................ | 108/91 |
| 469,842 A * | 3/1892 | Thompson | ................. | 312/210.5 |
| 1,507,977 A * | 9/1924 | Schaefer | ........................... | 220/6 |
| 1,607,441 A * | 11/1926 | Collen | ........................ | 312/334.3 |
| 1,640,664 A * | 8/1927 | Moore | ........................... | 384/19 |
| 2,535,646 A * | 12/1950 | Medwin | .......................... | 108/63 |
| 2,850,344 A * | 9/1958 | Cook | ............................ | 312/9.48 |
| 3,000,683 A * | 9/1961 | MacNeary | ................. | 312/235.3 |
| 3,367,675 A * | 2/1968 | Gearin | .......................... | 280/639 |
| 3,410,328 A * | 11/1968 | Sasai | ............................ | 220/9.2 |
| 3,806,219 A * | 4/1974 | Ahmann | ........................ | 312/265 |
| 4,249,749 A * | 2/1981 | Collier | ............................ | 280/35 |
| 4,854,652 A * | 8/1989 | Ahmann | ..................... | 312/140.2 |
| 5,655,628 A * | 8/1997 | Lin | ................................ | 187/414 |
| 5,991,150 A * | 11/1999 | Chiu et al. | ............... | 361/679.05 |
| 6,053,590 A * | 4/2000 | Chang | ............................ | 312/284 |
| 6,532,147 B1 * | 3/2003 | Christ, Jr. | ................. | 361/679.27 |
| 7,322,467 B2 * | 1/2008 | Youngblood | .................. | 206/233 |
| 2004/0036390 A1 * | 2/2004 | Woo | ............................. | 312/334.3 |
| 2013/0206753 A1 * | 8/2013 | Zhang et al. | .................... | 220/9.2 |

* cited by examiner

*Primary Examiner* — David R Dunn
*Assistant Examiner* — Ryan A Doyle
(74) *Attorney, Agent, or Firm* — Chun-Ming Shih

(57) ABSTRACT

A computer case includes a first sidewall, a plurality of peripheral walls, a retractable fence, and a second sidewall. One side of each of the peripheral walls connects with the first sidewall in a surrounding manner; one end of the retractable fence is disposed to the other side of each of the peripheral walls. The retractable fence is able to reciprocate along an extending direction of the peripheral walls. Besides, the second sidewall connects with the other end of the retractable fence in a surrounding manner. An inner space of the computer case is selectively increased or decreased by the reciprocating of the retractable fence for replacing a cooling module or an electronic component with different width.

6 Claims, 5 Drawing Sheets

COMPUTER CASE

BACKGROUND

1. Technical Field

This disclosure relates to a computer case, and more particularly to a computer case which can adjust an inner space of the computer case.

2. Related Art

Nowadays, the computers and the internet are very popular. Everyone contacts different kinds of computer products or computer applications in their daily lives, and some people even have two computers at their homes.

Computers at home are usually desktop computers, that is, a computer mainly includes a screen separated from a host. In current computer products, users often pursuit faster or latest hardware, so they often replace components in their computers. For example, a motherboard, a video card, fans, or hard drives in the computer case might be replaced. A motherboard with higher performance usually needs a better cooling module, in order to exhaust the heat the motherboard generated, or needs different specifications of electronic components, so as to improve the performance of the motherboard.

Different specifications of cooling modules or electronic components may have different width. If the width of the computer case is shorter than that of a cooling module or an electronic component, therefore, it is impossible to install such a cooling module or electronic component in the computer case.

SUMMARY OF THIS DISCLOSURE

In view of the above problem, this disclosure provides a computer case to solve the issue that computer cases in the prior art can not adjust the inner space thereof, such that the computers can not adopt different specifications of cooling module, or that users need to buy another computer cases.

The computer case of this disclosure includes a first sidewall, a plurality of peripheral walls, a retractable fence and a second sidewall. One side of each of the peripheral walls connects with the first sidewall in a surrounding manner, and one end of the retractable fence is disposed to the other side of each of the peripheral walls. The retractable fence is able to reciprocate along an extending direction of the peripheral walls. The second sidewall connects to the other end of the retractable fence in a surrounding manner.

In one or more embodiments, the second sidewall includes a transparent portion, and the transparent portion is made of glass or transparent plastic.

In one or more embodiments, the retractable fence includes a plurality of ring frames and a plurality of stands. Two of the ring frames respectively connect with the other side of each peripheral wall and the second side wall in a surrounding manner, and two opposite surfaces of each ring frame are respectively formed with a trench. These stands have two ends disposed in the trenches of the ring frames in a sliding manner. When the retractable fence reciprocates along the extending direction of the peripheral walls, the ends of the stands slide in the trenches with the movement of the ring frames.

In one or more embodiments, a plurality of hollow portions are defined among the ring frames.

In one or more embodiments, the computer case can further include a positioning component. One end of the positioning component is fixed on the second side wall, and the positioning component is located at an outer surface of the retractable fence and slides in correspondence with one of the peripheral walls. In yet another embodiment, the positioning component includes a plurality of positioning grooves, and the peripheral wall further includes a bump. The positioning component slides on the peripheral wall or is fixed when the bump embeds into one of the positioning grooves.

In one or more embodiments, the peripheral wall can further have a rail corresponding to the positioning component, and the positioning component reciprocates in the rail. The peripheral wall can further have an indentation, and the rail is disposed in the indentation.

In one or more embodiments, the computer case includes two positioning components disposed on the peripheral walls in symmetry. One end of each positioning component is fixed on the second side. Each positioning component is located at the outer surface of the retractable fence and slides in correspondence with the peripheral walls.

An inner space of the computer case is selectively increased or decreased by the reciprocating of the retractable fence, and the retractable fence can be fixed via the embedment of the bump and the positioning groove. Therefore, when replacing the cooling module or the electronic components, users can adjust the position of the retractable fence according to the width of the cooling module or the electronic components without replacing the computer case.

Besides, a plurality of hollow portions are formed among the ring frames. Therefore, when the computer operates, the heat generated by hardware components, for example, a motherboard, a power supply, a video card, and hard drives, can be exhausted via these hollow portions, thus cooling these hardware components.

The detail of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THE DISCLOSURE

Figure 1:
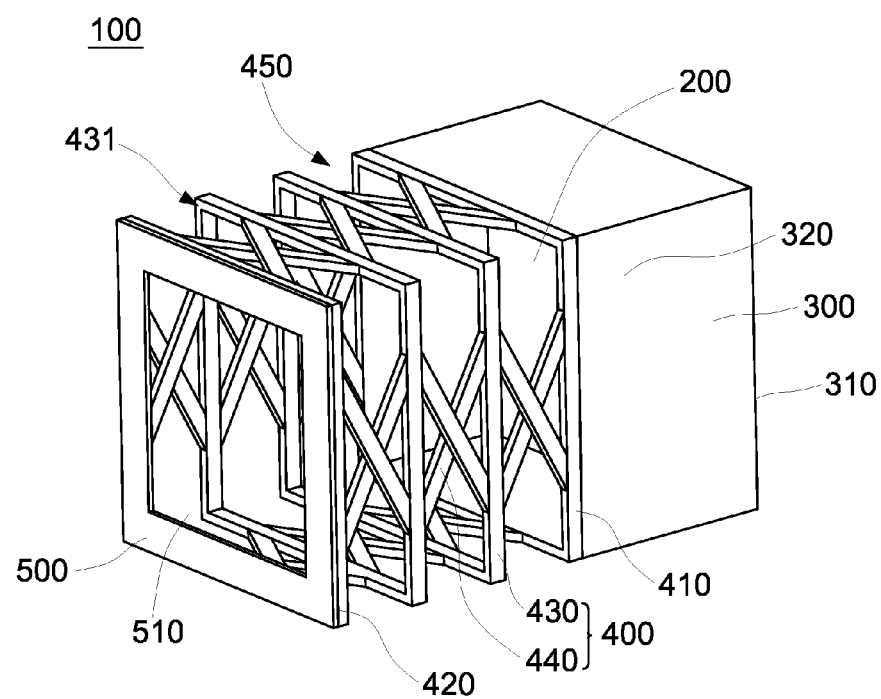
FIG. 1 is a perspective view of the computer case in an extended state according to a first embodiment.
Figure 2:
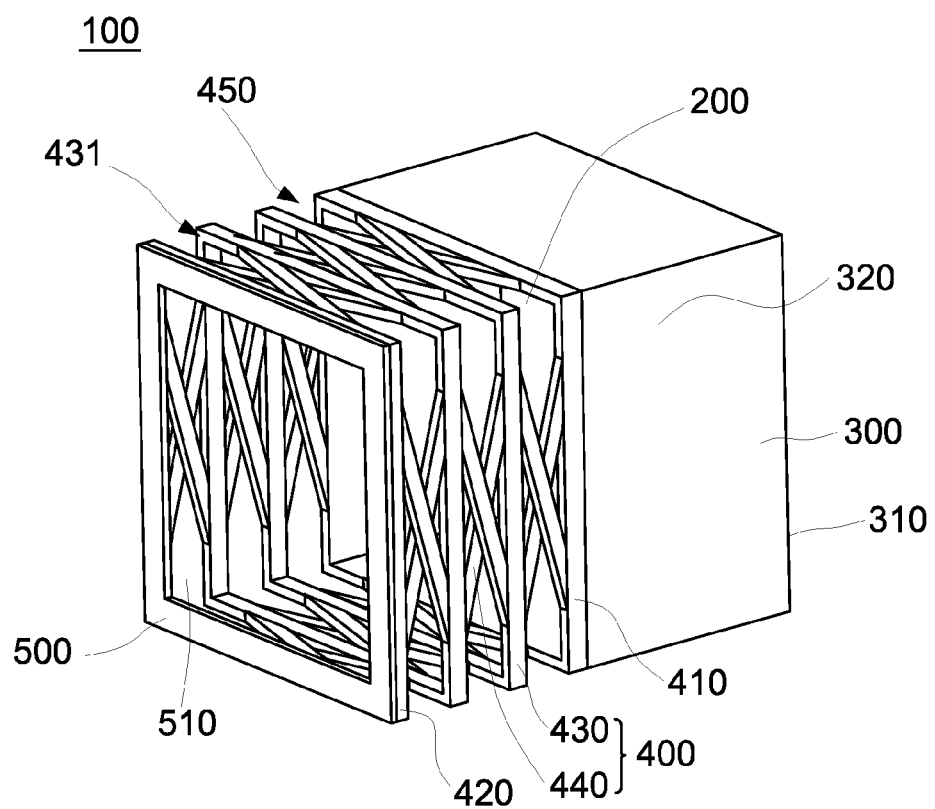
FIG. 2 is a perspective view of the computer case in a compressed state according to the first embodiment.

Refer to FIG. 1 and FIG. 2. A computer case 100 according to the first embodiment includes a first sidewall 200, a plurality of peripheral walls 300, a retractable fence 400, and a second sidewall 500. A first side 310 of each peripheral wall 300 connects to the first sidewall 200 in a surrounding manner. In general, hardware components, such as a motherboard, a video card, fans, or hard drives, are disposed to the first sidewall 200 and are surrounded by the peripheral walls 300. A first end 410 of the retractable fence 400 is disposed to a second side 320 of each peripheral wall 300, and a second sidewall 500 connects with a second end 420 of the retractable fence 400.

The retractable fence 400 is able to reciprocate along an extending direction of the peripheral walls 300, so that an inner space of the computer case 100 is selectively increased or reduced. In other words, the extension or compression of the retractable fence 400 is mainly for adjusting the width of the inner space of the computer case 100, such that the computer case 100 is not inappropriate when a cooling module or an electronic component with different width is replaced on the motherboard.

The retractable fence 400 further includes a plurality of ring frames 430 and a plurality of stands 440. Two of the ring frames 430 respectively connect with the second side 320 of each peripheral wall 300 and the second sidewall 500 in a surrounding manner. Two opposite surfaces of each ring frame 430 are respectively formed with a trench 431. The two ends of each stand 440 are disposed in the trenches 431 of the ring frames 430 in a sliding manner. When the retractable fence 400 reciprocates along the extending direction of the peripheral walls 300, the ends of stands 440 slide in the trenches 431 with the movement of the ring frames 430. One of the advantages of the retractable fence 400 is that in the coordination of the ring frame 430 and the stands 440, the position of the retractable fence 400 can be directly adjusted according to the width of the cooling module or the electronic component, so as to increase or decrease the width of the inner space of the computer case 100.

Besides, the ring frames 430 and the stands 440 of the retractable fence 400 form a plurality of hollow portions 450. These hollow portions 450 help exhaust the heat generated by the hardware components, such as a motherboard, a power supply, a video card, or hard drives, when the computer is operating, thus cooling these hardware components.

Figure 3:
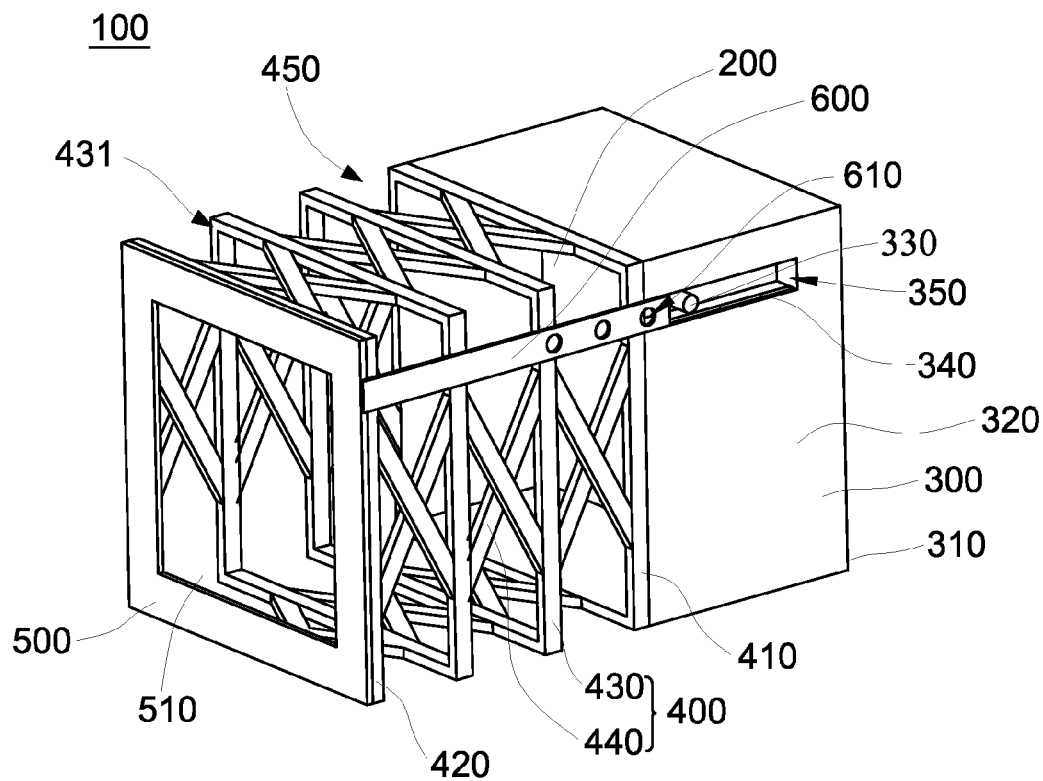
FIG. 3 is a perspective view of the computer case in the extended state according to a second embodiment.
Figure 4:
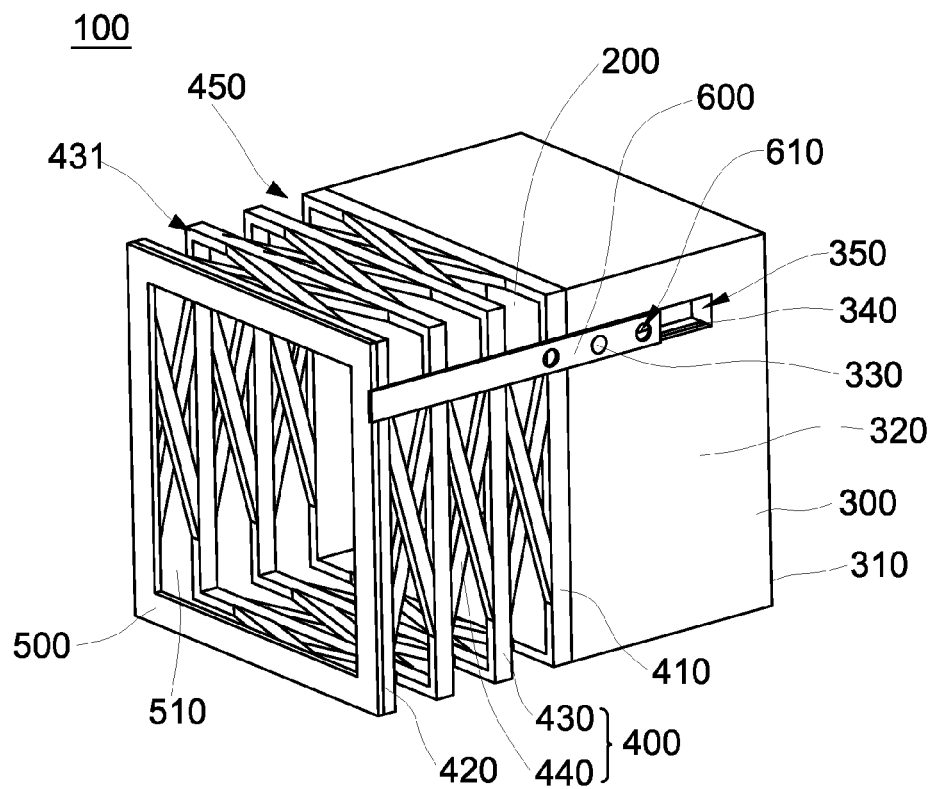
FIG. 4 is a perspective view of the computer case the in the compressed state according to the second embodiment.

Refer to FIG. 3 and FIG. 4. Except for the first sidewall 200, a plurality of peripheral walls 300, the retractable fence 400, and the second sidewall 500, the computer case 100 according to the second embodiment further includes a positioning component 600. One end of the positioning component 600 is fixed on the second sidewall 500, and the positioning component 600 is located at an outer surface of the retractable fence 400 and slides in correspondence with one of the peripheral walls 300.

Specifically, when the retractable fence 400 moves and changes the inner width of the inner space of the computer case 100, the positioning component 600 moves as well. Take FIG. 3 and FIG. 4 as an illustration, when the positioning component 600 moves and drives the retractable fence 400 to extend or compress, the positioning component 600 slides on the outer space of one of the peripheral walls 300. The peripheral walls 300 further have a rail 340 corresponding to the positioning component 600, and the positioning component 600 reciprocates in the rail 340, so as to make the reciprocating of the retractable fence 400 more stable. The peripheral walls 300 further have an indentation 350, and the rail 340 is disposed in the indentation 350. More specifically, the positioning component 600 reciprocates in the rail 350 disposed in the indentation 350, such that the positioning component 600 does not protrude in the peripheral wall 300.

The positioning component 600 further includes a plurality of positioning grooves 610, and the peripheral wall 300 has a bump 330. When the retractable fence 400 moves to the appropriate position according to the width of the cooling module or the electronic component, users can embed the bump 330 into one of the positioning grooves 610 to fix the retractable fence 400. In other words, the retractable fence 400 can be fixed via the embedment of the bump 330 and the positioning grooves 610, such that the retractable fence 400 will not move by accidental touches.

Figure 5:
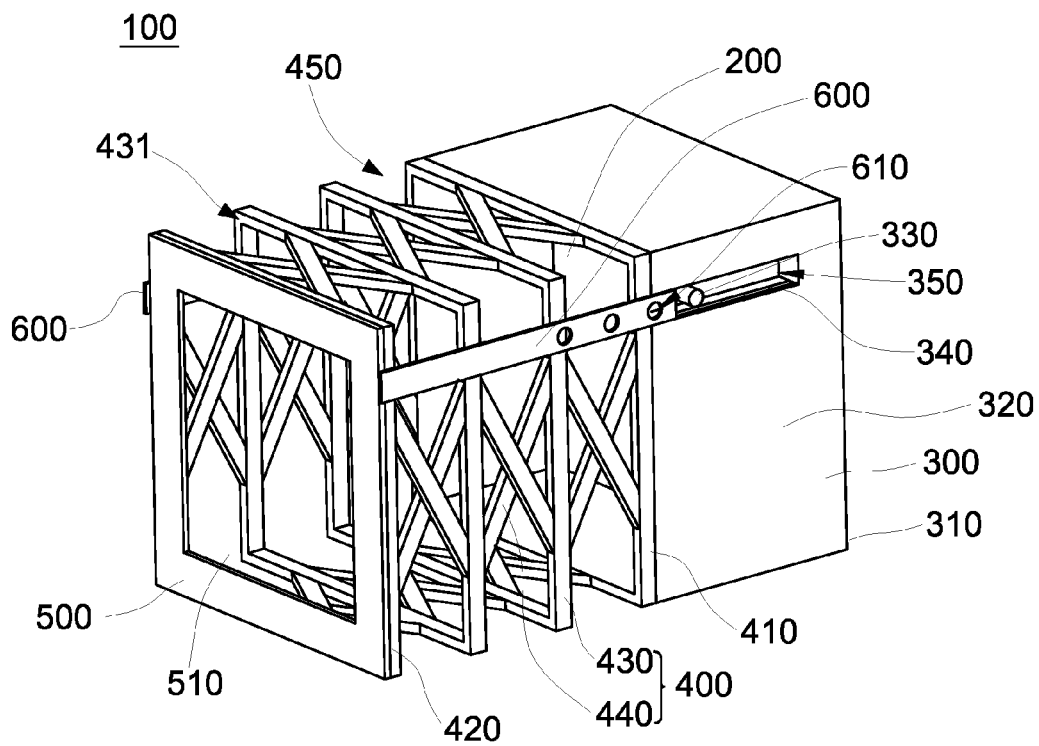
FIG. 5 is a perspective view of the computer case according to a third embodiment.

Refer to FIG. 5. The computer case 100 includes two positioning components 600 disposed on the peripheral walls 300 in symmetry, so as to make a more stable fixed retractable fence 400. One end of each positioning component 600 is fixed on the second sidewall 500, and each positioning component 600 is located at the outer surface of the retractable fence 400 and slides in correspondence with the peripheral wall 300. The function of two positioning components 600 here is similar to that of the aforementioned positioning component 600, the inventor will not repeat here.

The second sidewall 500 includes a transparent portion 510, and the transparent portion 510 can be made of glass or transparent plastic, such that users can see the hardware inside the computer case 100. If the hardware crashes, users can quickly determine what the problem is and deal with it timely.

People having ordinary skill in the art can make proper modification to the computer case 100 according to the actual needs or design requirements, not limited as described herein.

Except for the better cooling performance, the computer case 100 of this disclosure is able to adjust the width of the inner space of the computer case 100 easily and fix the position of the retractable fence 400 via the embedment of the bump 330 of each peripheral wall 300 and the positioning grooves 610 in the positioning component 600, such that different specifications of the cooling module or electronic component can be installed in the computer case 100. Hence, the computer case 100 can reduce the cost of buying additional computer cases in the prior art when the cooling module or electronic component with different width is replaced.

Though the embodiments of this disclosure are disclosed as described above, this is not to limit this disclosure. People having ordinary skill in the art will recognize that this disclosure can be practiced with modification within the spirit and scope of the claim. It is therefore to be understood that this disclosure is not to be limited by the foregoing description but only by the appended claims.

What is claimed is:

1. A computer case, comprising:
   a first sidewall;
   a plurality of peripheral walls including two sides, wherein one of the side of the peripheral walls connects with the first sidewall in a surrounding manner;
   a retractable fence including two ends, wherein one of the end of the retractable fence is disposed to the other side of the peripheral walls and the retractable fence reciprocates along an extending direction of the peripheral walls;
   a second sidewall, connecting with the other end of the retractable fence in a surrounding manner; and
   a positioning component with one end of the positioning component fixed on the second sidewall and the positioning component located at an outer surface of the retractable fence and sliding in correspondence with one of the peripheral walls;
   wherein the positioning component includes a plurality of positioning grooves, the peripheral wall has a bump, a rail and an indentation, the bump and the rail are disposed in the indentation, the rail corresponding to the positioning component, and the positioning component reciprocates in the rail of the peripheral wall for embedding the bump into one of the positioning grooves.

2. The computer case as claimed in claim 1, wherein the second sidewall further includes a transparent portion.

3. The computer case as claimed in claim 2, wherein the transparent portion is made of glass or transparent plastic.

4. The computer case as claimed in claim 1, wherein the retractable fence includes:

a plurality of ring frames, wherein two of the ring frames respectively connects with the other side of each peripheral wall and the second sidewall in a surrounding manner and two opposite surfaces of each ring frame are respectively formed with a trench; and a plurality of stands, having two ends disposed in the trenches of the ring frames in a sliding manner, and when the retractable fence reciprocates along the extending direction of the peripheral walls, the ends of the stands slide in the trenches with the movement of the ring frames.

5. The computer case as claimed in claim 4, wherein a plurality of hollow portions are defined among the ring frames.

6. The computer case as claimed in claim 1, further comprising two positioning components disposed on the peripheral walls in symmetry, one end of each positioning component fixed on the second sidewall, each positioning component located at an outer surface of the retractable fence and sliding in correspondence with the peripheral walls.

* * * * *